US012690062B2

(12) United States Patent
Smith et al.

(10) Patent No.: US 12,690,062 B2
(45) Date of Patent: Jul. 21, 2026

(54) SCHEDULED AND RANDOM ACCESS UPLINK RESOURCE UNIT ALLOCATION

(71) Applicant: Cisco Technology, Inc., San Jose, CA (US)

(72) Inventors: Malcolm M. Smith, Richardson, TX (US); Matthew A. Silverman, Shaker Heights, OH (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 18/452,448

(22) Filed: Aug. 18, 2023

(65) Prior Publication Data

US 2024/0381414 A1    Nov. 14, 2024

Related U.S. Application Data

(60) Provisional application No. 63/501,584, filed on May 11, 2023.

(51) Int. Cl.
| | |
|---|---|
| *H04W 84/12* | (2009.01) |
| *H04W 72/542* | (2023.01) |
| *H04W 74/02* | (2009.01) |
| *H04W 74/04* | (2009.01) |
| *H04W 74/0833* | (2024.01) |

(52) U.S. Cl.
CPC ......... *H04W 74/02* (2013.01); *H04W 72/542* (2023.01); *H04W 74/04* (2013.01); *H04W 74/0833* (2013.01); *H04W 84/12* (2013.01)

(58) Field of Classification Search
CPC ... H04W 74/02; H04W 72/542; H04W 74/04; H04W 74/0833; H04W 84/12
USPC .......................................................... 370/329
See application file for complete search history.

(56) References Cited

U.S. PATENT DOCUMENTS

| | | |
|---|---|---|
| 2017/0332385 A1 | 11/2017 | Shirali et al. |
| 2018/0255589 A1* | 9/2018 | Patil .................. H04W 74/0816 |
| 2020/0029350 A1 | 1/2020 | Asterjadhi et al. |
| 2020/0412605 A1* | 12/2020 | Trivedi ................ H04W 74/02 |
| 2021/0014888 A1 | 1/2021 | Gopalakrishnan et al. |

(Continued)

FOREIGN PATENT DOCUMENTS

AU        2020294205 A1      1/2022

OTHER PUBLICATIONS

Sudeep Bhattarai et al., "Uplink Resource Allocation in IEEE 802.11ax," IEEE Xplore, Dated: Jul. 15, 2019, pp. 1-6.

(Continued)

*Primary Examiner* — Christopher R Crompton
(74) *Attorney, Agent, or Firm* — Patterson + Sheridan, LLP

(57) ABSTRACT

Techniques for resource unit (RU) allocation for wireless communication are disclosed. These techniques include identifying a first allocation of scheduled access (SA) and random access (RA) RUs for uplink from one or more wireless stations (STAs) to a wireless access point (AP) in a wireless local area network (WLAN). The techniques further include measuring one or more performance characteristics for the one or more STAs, determining a second allocation of uplink SA and RA RUs in the WLAN based on the measured one or more performance characteristics, and advertising the second allocation of uplink SA and RARUs to the one or more STAs.

17 Claims, 5 Drawing Sheets

(56)　　　　　　References Cited

U.S. PATENT DOCUMENTS

| 2021/0037412 A1 | 2/2021 | Changlani et al. |
| 2023/0117291 A1 | 4/2023 | Iwai et al. |

OTHER PUBLICATIONS

Eisen M., et al., "Learning Optimal Resource Allocations in Wireless Systems", A Dissertation, University of Pennsylvania, ISBN: 978-1-0883-4200-8, Jan. 1, 2019, XP093074033, 166 Pages, Retrieved from https://www.proquest.com/docview/2311654900?pq-origsite= gscholar&fromopenview=truesourcetype=Dissertations%20 &%20Theses on Aug. 16, 2023, p. 1, Paragraph 1, pp. 43-44, Paragraph 3.2.1, p. 46, Paragraph 3.3.1, pp. 64-65, Paragraph 4.1. International Search Report and Written Opinion for International Application No. PCT/US2024/027282, mailed Aug. 23, 2024, 15 Pages.

* cited by examiner

300

Start

302 — Determine RU space to reserve for SA

304 — Modify allocation of RUs to RA

306 — Measure baseline performance characteristics

308 — Monitor performance and adjust allocation

310 — Advertise RU allocation

End

308

Start

402

Identify performance characteristics and RU allocation

404

Use reinforcement learning to modify ML model based on performance

406

Predict next RU allocation using ML model

SCHEDULED AND RANDOM ACCESS UPLINK RESOURCE UNIT ALLOCATION

CROSS-REFERENCE TO RELATED APPLICATIONS

This application claims benefit of co-pending U.S. provisional patent application Ser. No. 63/501,584 filed May 11, 2023. The aforementioned related patent application is herein incorporated by reference in its entirety.

TECHNICAL FIELD

Embodiments presented in this disclosure generally relate to wireless communication networks. More specifically, embodiments disclosed herein relate to resource unit allocation for wireless communication.

BACKGROUND

In wireless systems with triggered uplink traffic, a wireless access point (AP) can begin a triggered uplink from a wireless station (STA) to the AP by polling the STA to determine how much data is in the STA's buffer. This poll from the AP to the STA is commonly called a Buffer Status Report (BSR) Poll (BSRP). The AP can then calculate how many resource units (RUs) to allocate to the STA and the duration of the next transmission opportunity (TXOP). This is a type of scheduled access (SA) that typically works well in wireless local area networks (WLANs) with a relatively small number of STAs. But there are many cases when this may not work as desired. For example, in a crowded WLAN with many STAs, the AP many not have enough RUs to allocate to the requesting STAs. Furthermore, an STA that urgently needs to send data may not want to wait for the next BSR, and an unsolicited BSR from the STA to the AP may go unanswered.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
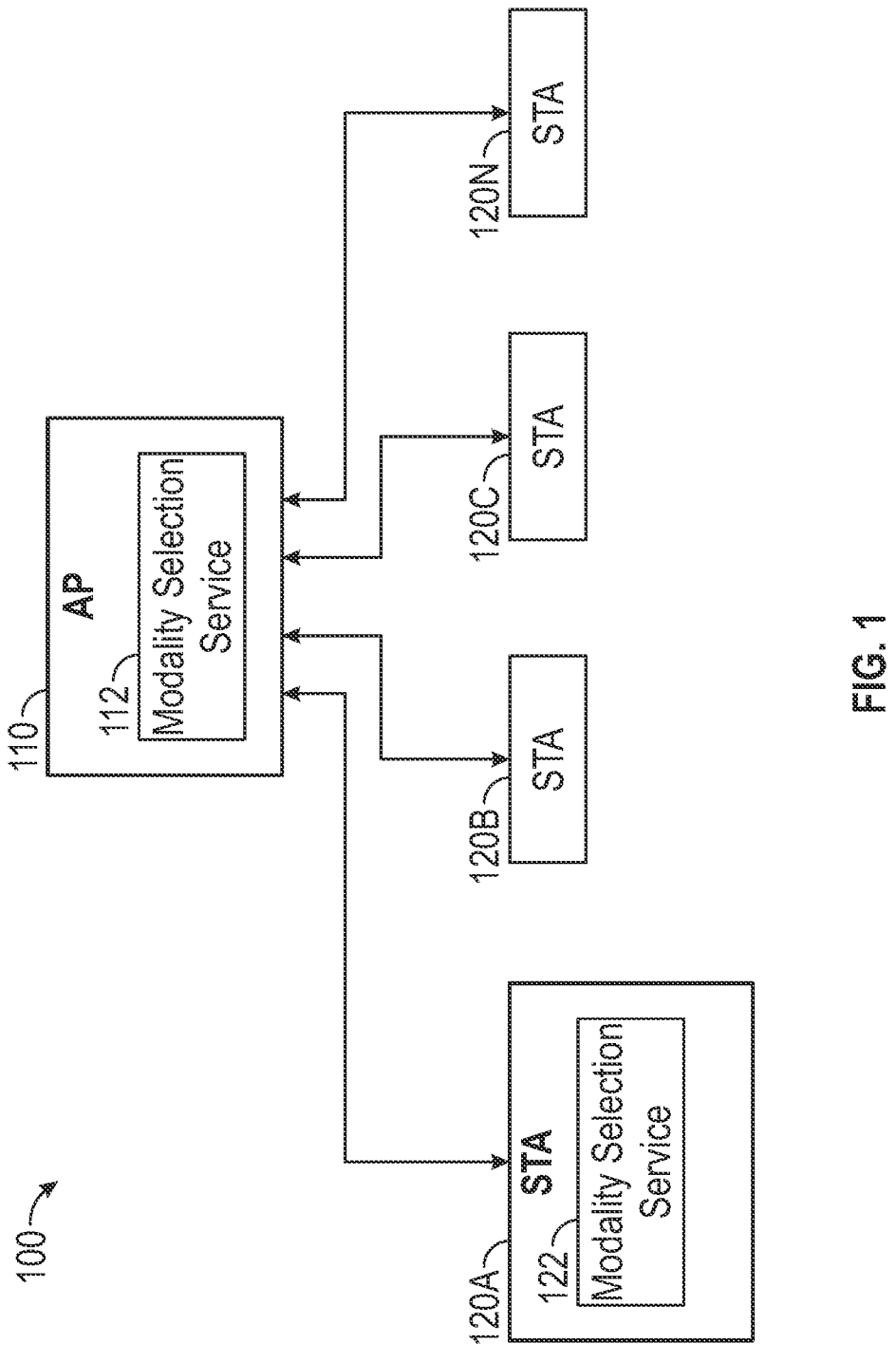
FIG. 1 illustrates scheduled and random RU allocation for wireless communication, according to one embodiment.

Embodiments include a method. The method includes identifying a first allocation of scheduled access (SA) and random access (RA) resource units (RUs) for uplink from one or more wireless stations (STAs) to a wireless access point (AP) in a wireless local area network (WLAN). The method further includes measuring one or more performance characteristics for the one or more STAs. The method further includes determining a second allocation of uplink SA and RA RUs in the WLAN based on the measured one or more performance characteristics. The method further includes advertising the second allocation of uplink SA and RA RUs to the one or more STAs.

Embodiments further include a system, including a processor and a memory having instructions stored thereon which, when executed on the processor, performs operations. The operations include identifying a first allocation of SA and RA RUs for uplink from one or more STAs to an AP in a WLAN. The operations further include measuring one or more performance characteristics for the one or more STAs. The operations further include determining a second allocation of uplink SA and RA RUs in the WLAN based on the measured one or more performance characteristics. The operations further include advertising the second allocation of uplink SA and RA RUs to the one or more STAs.

Embodiments further include a non-transitory computer-readable medium having instructions stored thereon which, when executed by a processor, performs operations. The operations include identifying a first allocation of SA and RA RUs for uplink from one or more STAs to an AP in a WLAN. The operations further include measuring one or more performance characteristics for the one or more STAs. The operations further include determining a second allocation of uplink SA and RA RUs in the WLAN based on the measured one or more performance characteristics. The operations further include advertising the second allocation of uplink SA and RA RUs to the one or more STAs.

EXAMPLE EMBODIMENTS

As discussed above, in some scenarios (e.g., a WLAN with a large number of STAs or STAs with urgent transmission requirements) SA using a BSRP may not provide suitable results. One alternative is to have STAs attempt to transmit using a Random Access (RA) regime. RA allows STAs to revert to an unscheduled transmit modality. RA can be implemented using a variety of techniques, including explicit triggered allocation (e.g., uplink orthogonal frequency division multiple access (OFDMA) based random access (UORA)), implicit enhanced distributed channel access (EDCA), other implicit RA techniques (e.g. leaving TXOP space between scheduled TXOPs from a stream classification service (SCS)) or any other suitable RA technique. In an embodiment, the AP reserves a set of RUs specifically for the purpose of RA.

Considering that WLANs may support a mix of RA and SA on the same basic service set (BSS), and that performance may vary greatly depending on which media access modality a STA is using (e.g., RA or SA), providing a technique to help STAs choose between SA and RA for uplink would provide significant improvements. For example, on a crowded WLAN, as RU availability is diminished an AP may not have capacity to support a STA according to its service level agreement (SLA) contract (e.g. target wake time (TWT), SCS, traffic specification (TSPEC), and other criteria). In these circumstances, the STA might be better served using RA instead of SA.

For example, while encouraging a move from SA to RA does not necessarily provide more capacity (e.g., RA is generally less airtime efficient and can be inefficient with low aggregation and requisite long aggregation timers), an STA can get earlier access to the channel in RA and hence experience less latency for critical traffic identifiers (TIDs). A preferred solution will not encourage all STAs to jump to RA for all TIDs, but instead control RU allocation to improve performance (e.g., using per-TID wait times to allocate RUs between RA and SA). Controlling how an STA takes advantage of RA is critical in managing SLAs, and can be managed by the way the AP allocates space to SA versus. RA modes on the WLAN.

One or more techniques discussed below allow for prediction of RU allocation (e.g., SA vs RA for RU allocation) to control STA use of SA and RA. For example, performance characteristics can be continuously measured and used to train an ML model (e.g., a reinforcement learning ML model) to predict the RU allocation. A reinforcement learning ML model can quickly converge on a preferred (e.g., optimal) RU allocation based on repeatedly modifying RU allocation and measuring corresponding performance characteristics. This predicted RU allocation can then be advertised to STA and used to improve performance.

FIG. 1 illustrates scheduled and random resource unit allocation for wireless communication, according to one embodiment. A wireless network 100 includes an AP 110 and four STAs 120A-N. In an embodiment, the STAs 120A-N can be any suitable wireless network station, including a laptop or desktop computer, a workstation or server, a smartphone, a tablet, an Internet of Things (IoT) device, or any other suitable STA. The AP 110 is wirelessly connected to each of the STAs 120A-N using a suitable wireless network connection, including any suitable Wi-Fi connection (e.g., an 802.11ax connection), or any other suitable wireless technology.

Each STA 120A-N can both receive data from the AP 110 (a downlink connection) and transmit data to the AP 110 (an uplink connection). In an embodiment, the AP 110 schedules both downlink communication (from the AP 110 to the respective STAs 120A-N) and uplink communication (from a given one of the STAs 120A-N to the AP 110). Further, in an embodiment, one or more of the 120A-N can communicate with each other (e.g., through the AP 110 or peer-to-peer).

In an embodiment, the AP 110 includes a modality selection service 112 which facilitates selection of an uplink modality (e.g., SA or RA) for uplink communication from the STAs 120A-N. For example, the modality selection service 112 can implement the one or more of the techniques discussed further below in regard to FIGS. 2-4.

In an embodiment, the STA 120A includes a modality selection service 122. In an embodiment, the modality selection service 122 manages selection of an uplink modality (e.g., SA or RA) for uplink data transmission from the STA 120A to the AP 110. This is discussed further below in regard to FIGS. 2-4.

Figure 2:
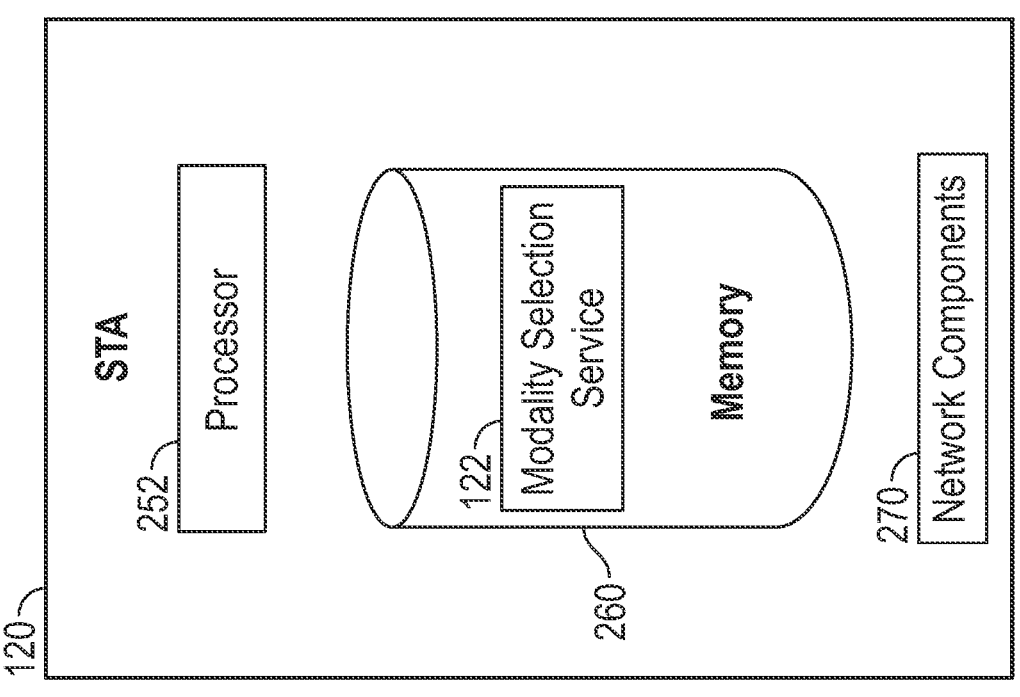
FIG. 2 illustrates an AP and STA for scheduled and random RU allocation for wireless communication, according to one embodiment.
Figure 2:
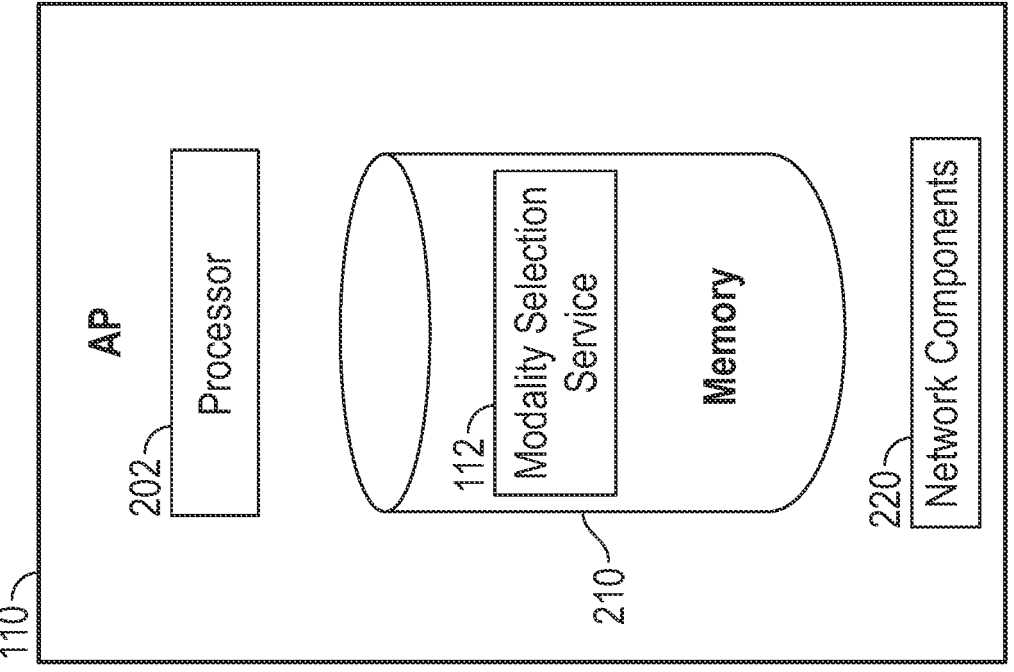

FIG. 2 illustrates an AP 110 and STA 120 for scheduled and random resource unit allocation for wireless communication, according to one embodiment. The AP 110 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP 110 to interface with a wireless communication network, as discussed above in relation to FIG. 1. For example, the network components 220 can include WiFi or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 110. The program code is generally described as various functional "applications" or "modules" within the memory 210, although alternate implementations may have different functions and/or combinations of functions. Within the memory 210, the modality selection service 112 facilitates selection of an uplink modality (e.g., SA or RA) for uplink communication from STAs to the AP, as discussed further in relation to FIGS. 3-4.

The STA 120 includes a processor 252, a memory 260, and network components 270. In an embodiment, the STA 120 corresponds with any of the STAs 120A-N illustrated in FIG. 1. The processor 252 generally retrieves and executes programming instructions stored in the memory 260. The processor 252 is representative of a single central processing unit (CPU), multiple CPUs, a single CPU having multiple processing cores, graphics processing units (GPUs) having multiple execution paths, and the like.

The network components 270 include the components necessary for the STA 120 to interface with a wireless communication network, as discussed above in relation to FIG. 1. For example, the network components 270 can include WiFi or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the STA 120. The program code is generally described as various functional "applications" or "modules" within the memory 260, although alternate implementations may have different functions and/or combinations of functions. Within the memory 260, the modality selection service 122 manages selection of an uplink modality (e.g., SA or RA) for uplink data transmission from the STA 120A to the AP 110. This is discussed further below in regard to FIGS. 3-4.

Figure 3:
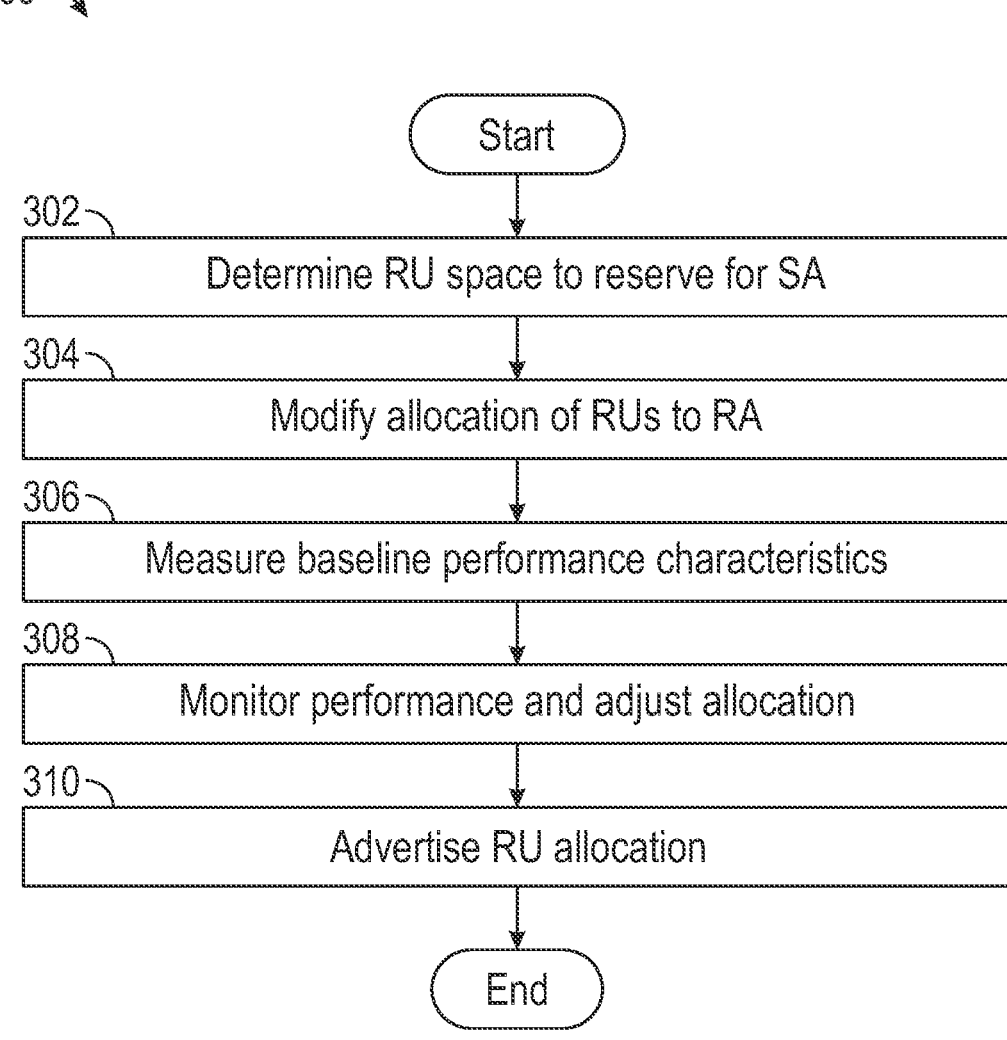
FIG. 3 is a flowchart illustrating scheduled and random RU allocation for wireless communication, according to one embodiment.

FIG. 3 is a flowchart 300 illustrating scheduled and random resource unit allocation for wireless communication, according to one embodiment. At block 302, a modality selection service (e.g., the modality selection service 112 illustrated in FIGS. 1-2) at an AP (e.g., the AP 110 illustrated in FIGS. 1-2) determines RU space to reserve for SA. In an embodiment, the AP determines how much RU space should be reserved for SA STAs. For example, the AP can reserve SA RU space for SCS flows that are considered critical.

In an embodiment, STAs (e.g., one or more of the STAs 120A-N) illustrated in FIG. 1) that prefer to perform an UL transmission may choose not to wait for the AP to issue a BSR, and will do an unsolicited BSR (UBSR), proactively informing the AP that they have UL data to transmit. As both unsolicited BSRs and normal triggered BSRs from the STAs are examined by the AP, in an embodiment the AP can perform a calculation on how many STAs (or flows) can and cannot be adequately served by SA mode, and the time which will be left to support prioritized TIDs.

Alternatively, or in addition, the AP can keep statistics on how much buffer is left over after a triggered UL physical protocol data unit (PPDU) transmission. In an embodiment, the left over buffer represents the difference between the BSR and the amount of data the STA has to send at that point of UL PPDU transmission. For example, the AP can track the left over buffer in a new poll to the STA (e.g., the STA can track leftovers and respond to the poll).

As another example, the network can intermittently do a BSRP right after UL PPDU transmission, to determine statistics on left overs in the buffer. While the techniques discussed in association with block 302 (and subsequent blocks in FIG. 3) are discussed as being performed by an AP, this is merely an example. Any suitable network component (e.g., a WLAN controller (WLC) or any other suitable network component) can be used for any suitable aspect of FIG. 3.

At block 304, the modality selection service modifies allocation of RUs to RA. In an embodiment, as the AP evaluates potential oversubscription of SA RU availability, it responds by gradually allocate more RU space to RA (e.g., triggered or un-triggered RA, as discussed above). Allocating more RU space to RA can allow more RU space for STAs to contend for access to the transmission medium, instead of waiting to be served by the next available SA period At block 306, the modality selection service measures baseline performance characteristics. In an embodiment, there is a performance trade-off between making STAs wait longer for their next scheduled SA TXOP, as opposed to APs taking their chances using RA RUs (e.g., in an EDCA mode). The AP can take a measurement of performance characteristics of various SCS values, TID values, or both, as a baseline, along with overall WLAN throughput and any other suitable performance characteristics.

In an embodiment, this includes a measurement of aggregate throughput of the RA and SA groupings. Alternatively, or in addition, the AP monitors average wait times (e.g., for all TIDs), focusing on the higher priority TIDs. These measurements form the basis of key performance indicators (KPIs) that the AP can use to adjust RU allocation. This is discussed further, below, with regard to block 308.

At block 308, the modality selection service monitors performance and adjusts allocation. This is discussed further, below, with regard to FIG. 4. In an embodiment, the AP can monitor performance characteristics and adjust SA vs. RA allocation based on the measured performance. For example, the modality selection service can use a suitable ML model (e.g., a reinforcement learning ML model) to adjust the allocation. This is discussed further, below, with regard to FIG. 5.

At block 310, the modality selection service advertises the RU allocation. In an embodiment, as RU oversubscription is encountered (and especially as the AP's ability to service high-priority TIDs changes), the AP will issue a beacon (e.g., an 802.11 beacon) to encourage STAs to take advantage of the expanded SA space. For example, the AP can transmit an information element (IE) to advertise changes to the RA allocation, the SA time left, and any other suitable information. This allows underserved STAs to make a decision whether to wait for the next available TXOP offered by the AP (e.g. restricted TWT (rTWT), SCS setup, renewal or update, or any other suitable TXOP) with a pre-determined allocation (time, bandwidth, or any other suitable allocation), or to take its chances in the expanded RA mode.

Figure 4:
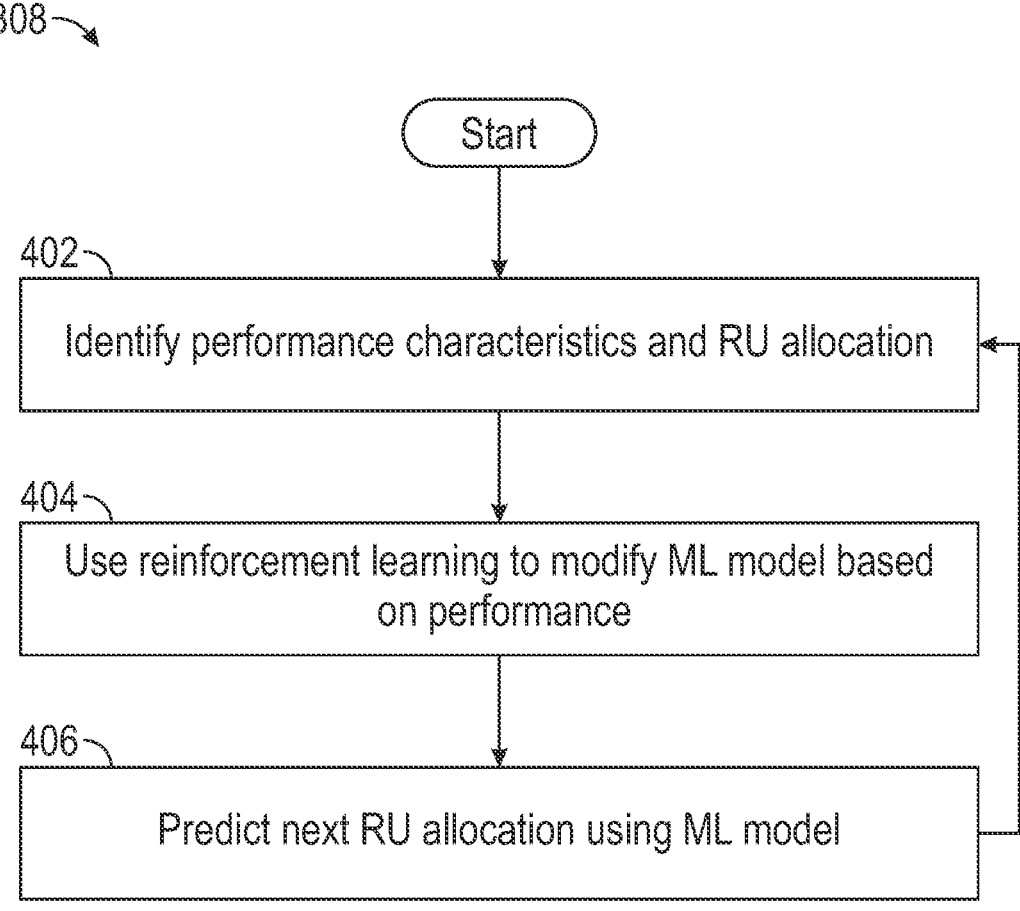
FIG. 4 is a flowchart illustrating monitoring performance and adjusting RU allocation, according to one embodiment.

FIG. 4 is a flowchart illustrating monitoring performance and adjusting RU allocation, according to one embodiment. In an embodiment, FIG. 4 corresponds with block 308 illustrated in FIG. 3. At block 402, a modality selection service (e.g., the modality selection service 112 illustrated in FIGS. 1-2) at an AP (e.g., the AP 110 illustrated in FIGS. 1-2) identifies performance characteristics and RU allocation.

In an embodiment, as the AP begins to adjust the size of the SA vs. RA RU allocation space, it continually monitors performance characteristics outlined in the previous step. The goal is to find a suitable performance value (e.g., an optimal performance value) based on a variety of objective functions (e.g. total aggregate throughput, throughput per-TID, or any other suitable criteria). To accomplish this, the modality selection service first identifies the measured performance characteristics and the current resource allocation.

At block 404, the modality selection service uses reinforcement learning to modify an ML model based on performance. In an embodiment, a reward and penalty learning mechanism, such as reinforcement learning, can be used to prepare an ML model to predict a preferred SA vs RA allocation of RUs. As the AP adjusts the SA and RA RU allocation, the modality selection service continually monitors performance based on KPIs of the desired objective function (e.g. total aggregate throughput, throughput per-TID, or any other suitable criteria). When changes to the allocation either improve or degrade KPIs, the ML model is trained with a reward or a penalty, allowing the ML model to quickly converge on a preferred (e.g., optimal) balance of the SA vs RA RU allocation.

For example, if the AP allocates too many RUs to RA mode and it notices that excessive contention has unexpectedly degraded performance, the modality selection service can train the ML model to avoid this allocation based on the model's input values. In a short period of time the ML model will converge to a balance that optimizes performance. This evaluation is in constant re-evaluation as the WLAN dynamics change. Reinforcement learning is merely one example, and any suitable ML model and ML technique can be used (e.g., supervised learning, unsupervised learning, or any other suitable technique).

At block 406, the modality selection service predicts a next RU allocation using the ML model. In an embodiment, the ML model can be provided with the performance characteristics and RU allocation and can predict a next SA vs RA RU allocation. This is discussed further, below, with regard to FIG. 5. The flow then returns to block 402.

Figure 5:
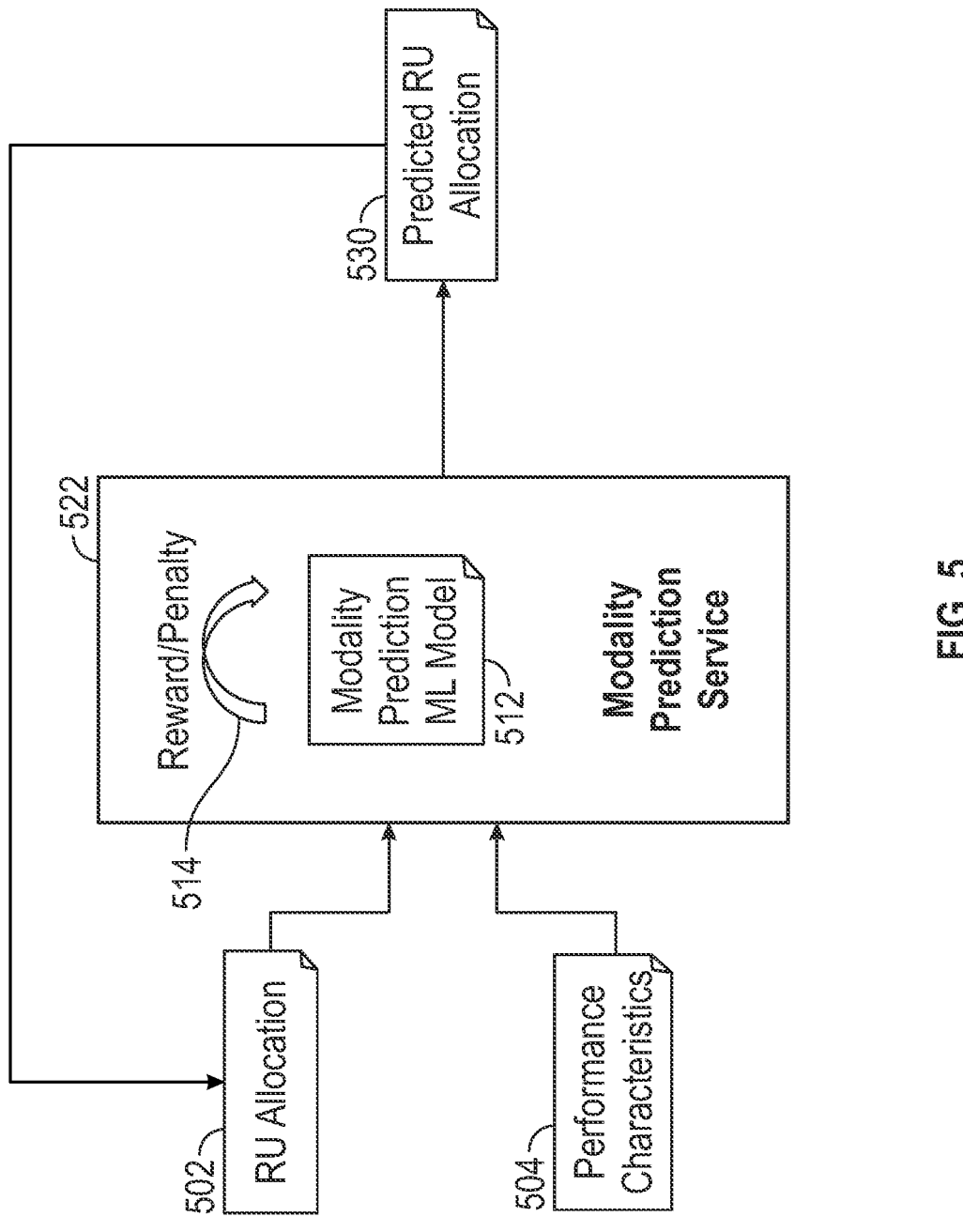
FIG. 5 illustrates a modality prediction ML model, according to one embodiment.

FIG. 5 illustrates a modality prediction ML model, according to one embodiment. In an embodiment, a modality prediction service 522 uses a modality prediction ML model 512 to generate a predicted RU allocation 530 (e.g., an SA vs RA RU allocation) based on a current RU allocation 502 and performance characteristics 504.

As discussed above in relation to FIG. 4, in an embodiment a reward and penalty learning mechanism, such as reinforcement learning, can be used to prepare an ML model to predict a preferred SA vs RA allocation of RUs. The modality prediction ML model 512 can be a reinforcement learning ML model, and a reward or penalty 514 can be applied, based on changes to performance characteristic 504 as the RU allocation 502 changes, to train the modality prediction ML model 512 to converge on a preferred (e.g., optimal) allocation. In an embodiment, any suitable reinforcement learning model or technique can be used.

Further, reinforcement learning is merely an example. In an embodiment, reinforcement learning can be a suitable technique because WLAN characteristics vary significantly between implementation, and so training a supervised ML model to predict an RU allocation is likely to be extremely burdensome (e.g., a very large amount of training data and training compute resources could be required) and inaccurate. Reinforcement learning, by contrast and for example, can converge on a preferred allocation quickly based on the particular characteristics of the WLAN implementation at issue.

But reinforcement learning is merely one option, and for some implementations other techniques may be more suitable (e.g., supervised learning, unsupervised learning, semi-supervised learning, or any other technique). Further, using an ML model is not required. The modality prediction service 522 could use rule-based techniques, or any other non-ML model based technique to predict the RU allocation.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

identifying a first allocation of scheduled access (SA) and random access (RA) resource units (RUs) for uplink from one or more wireless stations (STAs) to a wireless access point (AP) in a wireless local area network (WLAN);

measuring a total aggregate throughput of the one or more STAs while using the first allocation of SA and RA RUs;

determining, using a machine learning (ML) model, a second allocation of uplink SA and RA RUs in the WLAN based on the total aggregate throughput; and advertising the second allocation of uplink SA and RA RUs to the one or more STAs.

2. The method of claim 1, wherein the second allocation of uplink SA and RA Rus is based on the first allocation.

3. The method of claim 1, wherein the ML model is a reinforcement learning ML model.

4. The method of claim 3, further comprising:

modifying the ML model by providing at least one of a penalty or a reward to the ML model based on the first allocation and the total aggregate throughput.

5. The method of claim 1, wherein the one or more STAs use the second allocation to select between SA and RA for uplink transmission to the AP.

6. The method of claim 1, further comprising measuring per-traffic identifier (TID) wait times for the one or more STAs.

7. The method of claim 6, wherein determining the second allocation of uplink SA and RA RUs in the WLAN comprises:

determining to increase an allocation of RA RUs and decrease an allocation of SA RUs based on the per-TID wait times for the one or more STAs.

8. A system, comprising:

a processor; and a memory having instructions stored thereon which, when executed on the processor, performs operations comprising:

identifying a first allocation of scheduled access (SA) and random access (RA) resource units (RUs) for uplink from one or more wireless stations (STAs) to a wireless access point (AP) in a wireless local area network (WLAN);

measuring a total aggregate throughput of the one or more STAs while using the first allocation of SA and RA RUs;

determining, using a machine learning (ML) model, a second allocation of uplink SA and RA RUs in the WLAN based on the total aggregate throughput; and advertising the second allocation of uplink SA and RA RUs to the one or more STAs.

9. The system of claim 8, wherein the second allocation of uplink SA and RA Rus is based on the first allocation.

10. The system of claim 8, wherein the ML model is a reinforcement learning ML model, the operations further comprising:

modifying the ML model by providing at least one of a penalty or a reward to the ML model based on the first allocation and the total aggregate throughput.

11. The system of claim 8, wherein the one or more STAs use the second allocation to select between SA and RA for uplink transmission to the AP.

12. The system of claim 8, further comprising measuring per-traffic identifier (TID) wait times for the one or more STAs.

13. A non-transitory computer-readable medium having instructions stored thereon which, when executed by a processor, performs operations comprising:

identifying a first allocation of scheduled access (SA) and random access (RA) resource units (RUs) for uplink from one or more wireless stations (STAs) to a wireless access point (AP) in a wireless local area network (WLAN);

measuring a total aggregate throughput of the one or more STAs while using the first allocation of SA and RA RUs;

determining, using a machine learning (ML) model, a second allocation of uplink SA and RA RUs in the WLAN based on the total aggregate throughput; and advertising the second allocation of uplink SA and RA RUs to the one or more STAs.

14. The non-transitory computer-readable medium of claim 13, wherein the second allocation of uplink SA and RA Rus is based on the first allocation.

15. The non-transitory computer-readable medium of claim 13, wherein the ML model is a reinforcement learning ML model, the operations further comprising:

modifying the ML model by providing at least one of a penalty or a reward to the ML model based on the first allocation and the total aggregate throughput.

16. The non-transitory computer-readable medium of claim 13, wherein the one or more STAs use the second allocation to select between SA and RA for uplink transmission to the AP.

17. The non-transitory computer-readable medium of claim 13, further comprising measuring per-traffic identifier (TID) wait times for the one or more STAs.

* * * * *